United States Patent [19]

Caselli

[11] Patent Number: 5,455,289
[45] Date of Patent: Oct. 3, 1995

[54] PROCESS FOR THE STABILIZATION OF OLEFIN POLYMERS

[75] Inventor: Giancarlo Caselli, Ferrara, Italy

[73] Assignee: Montell North America Inc., Wilmington, Del.

[21] Appl. No.: 421,132

[22] Filed: Apr. 13, 1995

Related U.S. Application Data

[63] Continuation of Ser. No. 319,320, Oct. 6, 1994, abandoned, which is a continuation of Ser. No. 91112, Jul. 13, 1993, abandoned.

[30] Foreign Application Priority Data

Jul. 17, 1992 [IT] Italy ................................. MI92A1745

[51] Int. Cl.$^6$ ............................. C08K 5/13; C08K 5/36; C08K 5/49
[52] U.S. Cl. ..................... 523/223; 523/340; 524/570; 526/89
[58] Field of Search ..................... 523/223, 340; 524/570; 526/89

[56] References Cited

U.S. PATENT DOCUMENTS

| | | | |
|---|---|---|---|
| 3,271,185 | 9/1966 | Pollock | 523/340 |
| 3,328,489 | 6/1967 | Murdock | 523/340 |
| 3,389,130 | 6/1968 | Pollock | 260/94.3 |
| 4,129,629 | 12/1978 | Gordon | 523/340 |
| 4,379,871 | 4/1983 | Werle et al. | 523/340 |
| 4,407,989 | 10/1983 | Takao et al. | 523/340 |
| 4,451,589 | 5/1984 | Morman et al. | 523/124 |
| 4,820,752 | 4/1989 | Berens et al. | 523/340 |
| 4,960,593 | 10/1990 | Sevini et al. | 524/99 |
| 5,045,577 | 9/1991 | Mulhaupt et al. | 524/99 |
| 5,198,471 | 3/1993 | Nauman et al. | 523/340 |
| 5,236,962 | 8/1993 | Govoni et al. | 521/56 |

FOREIGN PATENT DOCUMENTS

| | | |
|---|---|---|
| 0254348 | 7/1987 | European Pat. Off. . |
| 0290149 | 4/1988 | European Pat. Off. . |
| 0350444 | 6/1989 | European Pat. Off. . |
| 0546573 | 12/1992 | European Pat. Off. . |

OTHER PUBLICATIONS

Billmeyer, Jr., *Textbook of Polymer Science*, A Wiley-Interscience Publication, New York, 1984, pp. 91–94.

*Primary Examiner*—Kriellion S. Morgan

[57] ABSTRACT

Disclosed is a process for adding stabilizers and, optionally, additives to polyolefins in particle form obtained in liquid monomer by means of Ziegler-Natta catalysts, where the addition of stabilizers and, optionally, additives is carried out in liquid monomer in a step that follows polymerization, but precedes the flashing of the liquid monomer, after the aluminum alkyl has been deactivated.

7 Claims, No Drawings

PROCESS FOR THE STABILIZATION OF OLEFIN POLYMERS

This application is a continuation of application Ser. No. 08/319,320, filed Oct. 6, 1994, abandoned, which is a continuation of application Ser. No. 08/091,112, filed Jul. 13, 1993, now abandoned.

The present invention relates to a process for the stabilization of olefin polymers, in particular to a process for the stabilization of olefin polymers produced by polymerization in liquid monomer, and whose stabilization is obtained by adding stabilizers in a step between the polymerization and the liquid monomer flashing step.

Process that consist of adding stabilizers directly in the olefin polymerization step have been known for some time in the art. European patent 92987, wherein high-yield Ziegler-Natta catalyst systems are used, describes a process that foresees the addition of stabilizers occurring by introducing in the polymerization reactor sterically hindered piperidine derivatives (known as HALS). The preferred HALS are those that do not contain reactive functional groups in the molecule, such as ester, ether, hydroxyl, carboxyl, ketone, primary amine groups, in order to avoid undesired reactions with the aluminum alkyl present in the polymerization environment.

Also known are processes, as described in published European patent applications 350 444 and 351 360, wherein a mixture of stabilizers comprising, besides the HALS, also high molecular weight sterically hindered phenols, and phosphites or phosphonites is added in polymerization.

The processes known up to now, however, are not satisfactory, because they do not induce a complete stabilization of the polymer obtained. In fact, in the first case cited above, the addition of HALS only confers to the polymer UV radiation protection and a certain thermostability. In the second case, although the protection is less limited, there will still be the need for a further addition of other stabilizers and additives, such as antiacid, lubricating and nucleating agents.

Another disadvantage of the above technique concerns polymerization yields, which decrease considerably due to the interactions between the aluminum alkyl and the components of the stabilizer mixture that are different from the HALS, in particular the phenolic compounds.

According to what is described in published European patent application EP-A-0546573 in the name of the Applicant, the damaging effects due to the addition of phenolic stabilizers during polymerization are eliminated by carrying out the polymerization by means of specific supported Ziegler-Natta catalyst.

The Applicants has now found a new process that allows the addition of all the necessary stabilizers directly in the mixture of olefin products coming from the polymerization reactors in liquid monomer. Said mixture consists essentially of polymer particles suspended in liquid monomer, where the soluble polymer fractions (generally having low molecular weight) that form during the polymerization process are present in solution. During the flashing step of the liquid monomer that follows the addition of the stabilizers, the above soluble polymer fractions deposit on the solid polymer particles, thus ensuring a good adhesion of the stabilizers on said particles.

The process of the present invention also allows the addition of all the additives needed to confer characteristics and properties to the polymer (e.g. color, flowability) together with the stabilizers.

One of the advantages of using the process of this invention is the possibility of using any compound generally used as stabilizer without having to exclude any of them because of their interaction with the catalyst system.

A second advantage derived from the process of this invention is the homogeneous distribution of the stabilizers and a more efficient stabilizing action, since the protection offered by the stabilizers that penetrate the polymer particles extends to a larger quantity of polymer. The protection of the stabilizers, in particular of the liquid stabilizers, in the polymer particles is favored by the fact that said stabilizers come in contact with the solid polymer particle before the deposition of the soluble polymer fraction on said solid polymer, which happens during the flashing of the liquid monomer. Thus, the stabilizers can easily penetrate the pores of the solid polymer particles. Moreover, the stabilizers, and optionally the other additives which are introduced by using the process of the present invention, are deposited and contained in the polymer particles almost quantitatively without relevant losses.

Another advantage derived from the process of the present invention is the savings in term of cost and time, due to the reduction in the number of additional processes steps that the polymer has to undergo. In fact, the polymer, after it has been dried from the liquid monomer, can be sent directly to be molded. This eliminates the processes of blending and extruding with stabilizers and additives.

A further advantage offered by the process of the present invention is a consequence of the elimination of the blending and extrusion processes, that can cause the degradation of the polymer due to the high temperature needed in order for them to be carried out.

Accordingly, the present invention is directed to a process for the addition of stabilizers and additives to polyolefins (homo- and copolymers) in particle form obtained in liquid monomer by means of Ziegler-Natta catalysts, wherein the addition of stabilizers and additives is carried out in liquid monomer in a step that follows the polymerization, but precedes the flashing of the liquid monomer, after the aluminum alkyl has been deactivated.

The polyolefins that can be used in the process of the present invention are preferably those obtained by way of polymerization in liquid ethylene monomer and $C_3$–$C_{10}$ $\alpha$-olefins, such as propylene, butene, pentene and 4-methylpentene-1, optionally in the presence of diolefins, such as butadiene and hexadiene. In particular, the process of the present invention is suitable for propylene homo- and copolymers, among which are the isotactic polypropylene and crystalline copolymers of propylene containing from 2 to 30% in moles of ethylene and/or $C_4$–$C_{10}$ $\alpha$-olefins.

The polymerization process is carried out in liquid monomer according to conventional polymerization procedures. A comonomer in the gaseous state, such as ethylene, can be dissolved in the liquid monomer. The liquid monomer can also contain diluents, such as propane, butane and isobutane, which allow one to reduce pressure in the polymerization reactor. Once the polymerization process is finished, the aluminum alkyl is deactivated by reaction, for example, with hydroxylic compounds that are introduced in the polymeric suspension at the exit of the polymerization reactor. Then the mixture of stabilizers, and optionally the additives, is added preferably in a particular container located between the polymerization reactor and the monomer flashing area. After the rapid flashing of the monomer in the flashing area, the particles of polymer containing additives and stabilizers are recovered, and the polymer is ready for further processing.

Using the technique described above, one can introduce in the polymer suspension in liquid monomer, individually or mixed with each other, the compounds belonging to the following classes of stabilizers and additives, which are listed in order to exemplify and not limit:

HINDERED PHENOLS: 2,6-di-tert-butyl-4-methylphenol (BHT); 2,4-di-tert-butyl-phenol; octadecyl 3-(3', 5'-di-tert-butyl-4' -hydroxyphenyl)propionate (IRGANOX 1076), tetrakis[methylene(3,5-di-tert-butyl-4-hydroxy-cinnamate)]methane (IRGANOX 1010), marketed by Ciba-Geigy; bis2,2'-methylene-bis(6-tert-butyl-4-methylphenol)terephthalate (HPM 12), by SFOS; 1,3,5-trimethyl- 2,4,6-tris(3,5-di-tert-butyl-4-hydroxybenzyl)benzene (ETHANOX 330) by Ethyl Corporation; tris(3,5-di-tert-butyl- 4-hydroxybenzyl)isocyanurate (GOOD-RITE 3114) marketed by Goodrich; 1,3,5-tris(4-tert-butyl-3-hydroxy- 2,6-dimethylbenzyl)1,3,5-triazine-2,4,6-(1H, 3H,5H)-trione (CYANOX 1790) marketed by Cynamid; 1,1,3-tris(2-methyl- 4-hydroxy-5-tert-butylphenyl)butane (TOPANOL CA) marketed by I.C.I.;

PHOSPHITES AND PHOSPHONITES: tris(2,4-di-tert-butylphenyl)phosphite (IRGAFOS 168), marketed by Ciba-Geigy; trinonyl phenyl phosphite (TNPP); distearyl pentaerythritol diphosphite (WESTON 618), di(2,4-di-tert-butylphenyl)pentaerithritol diphosphite (ULTRANOX 626), marketed by Borg-Warner Chemical; tetrakis(2,4-di-tert-butyl) 4,4'-diphenylidene diphosphonite (SANDOSTAB PEPQ), marketed by Sandoz;

SULFIDES, DISULFIDES AND THIOETHERS: distearyl-thio-dipropionate (DSTDP); dilauryl-thio-dipropionate (DLPLP); pentaerythritol-tetrakis-β-lauryl-thio-dipropionate (SANDOSTAB 4020), marketed by Sandoz; dioctadecyl disulfide (HOSTANOX SE-10) marketed by Hoechst;

MONOMERIC AND POLYMERIC HALS: poly(N-β-hydroxymethyl- 2,2,6,6-tetramethyl-4-hydroxy-piperidyl succinate) (TINUVIN 622), bis(1,2,2,6,6-pentamethyl-4-piperidyl)sebacate (TINUVIN 765), bis(2,2,6,6 -tetramethyl-4-piperidyl)sebacate (TINUVIN 770), poly{[6-( 1,1,3,3-tetramethylbutyl)-imine]-1,3,5-triazine-2,4-diol] [2-(2,2,6,6 -tetramethylpiperidyl)amine]hexamethylene-[4-(2,2,6,6-tetramethylpiperidyl)imine} (CHIMASSORB 944), marketed by Ciba-Geigy; polymethylpropyl-3-oxy [4-(2,2,6,6-tetramethyl-piperidinyl] siloxane (UVASIL 299), marketed by Enichem Synthesis;

UV ABSORBERS: 2-hydroxy-4-n-octoxy-benzophenone (CHIMASSORB 81), 2-(2'hydroxy-3'tert-butyl-5'-methylphenyl) 5-chlorobenzotriazole (TINUVIN 326) marketed by Ciba-Geigy;

QUENCHERS: nickel bis[O-ethyl(3,5-di-tert-butyl-4-hydroxybenzyl)]phosphonate;

ANTICORROSION AGENTS: Ca, Na, and Mg stearate; synthetic hydrotalcite;

ANTISTATIC AGENTS: ethoxylated tertiary amines; glyceryl monostearate;

SLIP AGENTS: erucamide; oleoamide;

ANTIBLOCKING AGENTS: amorphous silicas; zeolites;

NUCLEATING AGENTS: Na benzoate; dibenzylidene sorbitol and derivatives;

PIGMENTS AND DYES: Fe oxides; phthalocyanines;

OPTICAL BRIGHTENERS;

PARAFFIN WAXES (polyethylenic, polypropylenic);

HOMOPOLYMERS AND COPOLYMERS of various molecular weight either dissolved or finely dispersed.

The quantity of stabilizers, and optionally additives, to be added to the polymer particles produced is preferably between 0.005 and 50% by weight with respect to the polymer, more preferably between 0.01 and 30%.

The hydroxylic compounds that can be used as deactivators of the aluminum alkyl are many. Suitable deactivators include water, monohydric alcohols (such as methanol, ethanol, isopropanol, 2-ethyl-hexanol, cyclohexanol), polyhydric alcohols as such (such as ethylene glycol, polypropylene glycol, glycerin, sorbitol), or partially esterified (such as glycerin monostearate), amino alcohols such as ethanolamine (mono-, di-, and triethanolamine), optionally substituted on the nitrogen (tertiary amines like the ATMER 163 marketed by Atlas, for example).

The quantity of aluminum alkyl deactivator used ranges preferably from 0.1 to 5 moles per mole of aluminum alkyl to be deactivated.

The olefin polymers that can be used in the process of the present invention can be synthesized with any of the Ziegler-Natta catalysts capable of producing polymer particles in a perfectly regular form. Said catalyst is obtained from a catalyst component comprising a transition metal compound (particularly titanium or vanadium) and optionally an electron-donor compound, and a cocatalyst comprising an aluminum alkyl compound. Particularly preferred are the high-yield Ziegler-Natta catalysts. Said catalyst are obtained by reacting a solid component comprising a titanium compound with at least one Ti-halogen bond, and optionally an electron-donor compound, both supported on particles of active Mg dihalide, and an organic aluminum compound, in particular an aluminum trialkyl, optionally combined with an electron-donor compound.

The activity of the magnesium dihalide in the solid catalyst compound can be recognized by the fact that in the X-ray spectrum of the catalyst component, the maximum intensity reflection presents a width at half-peak at least 30% greater than the maximum intensity reflection which appears in the spectrum of the nonactivated Mg dihalide, or that major intensity reflection that appears in the nonactivated magnesium halides (with a surface area of less than 3 $m^2/g$) is no longer present, but in its place there is a halo with the maximum intensity shifted with respect to the position of the maximum intensity reflection of the nonactivated magnesium halide. The most active forms are those where the X-ray spectrum shows a halo. Magnesium chloride is the preferred compound among the magnesium halides. In the case of the most active forms of Mg chloride, the X-ray spectrum of the catalyst component shows a halo in place of the reflection which appears at the distance of 2.56 Å in the spectrum of the nonactivated chloride.

The preferred catalysts are those whose catalyst components are supported on $MgCl_2$ particles having a regular geometrical form. Said catalyst components can be obtained in various ways. For example, it is possible to prepare spherical particles of $MgCl_2$ adducts with electron-donor compounds preferably containing active hydrogen atoms, for example water, alcohols and phenols; these particles are caused to react with a Ti compound and, optionally, with an electron-donor compound. Before the reaction with the Ti compound, the electron-donor compound present in the adduct with the magnesium dichloride can be partially removed from said adduct, by way of heat treatment or by reaction with aluminum alkyl compounds, for example.

Examples of methods for the preparation of catalyst components of the type described above can be found in U.S. Pat. Nos. 3,953,414 and 4,399,054.

Examples of highly active and stereospecific catalysts that can be obtained by reacting the above mentioned catalyst components with an aluminum alkyl compound and an electron-donor compound selected from specific classes of silanes, are described in European patents 45975, 45976 and 45977.

The solid catalyst components used in the preparation of the catalysts comprise, as electron-donor compounds, compounds selected from ethers, ketones, lactones, compounds containing N, P and/or S atoms, and esters of mono- and dicarboxylic acids. Particularly suited are the esters of phthalic acid, such as diisobutyl, diisobutyl, dioctyl and diphenyl phthalate, and monobenzyl monobutyl phthalate; esters of malonic acid such as diisobutyl and diethyl malonate; alkyl and aryl pivalates; alkyl, cycloalkyl and aryl maleates; alkyl and aryl carbonates such as diisobutyl carbonate, monoethyl-monophenyl carbonate and diphenyl carbonate; esters of succinic acid such as the mono and diethyl succinate.

Other electron-donors particularly suited are the 1,3-diethers of formula (I)

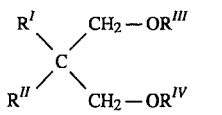 (I)

$R^I$ and $R^{II}$ are the same or different and are $C_1$–$C_8$ alkyl, $C_3$–$C_8$ cycloalkyl or $C_3$–$C_{18}$ aryl radicals; $R^{III}$ and $R^{IV}$ are the same or different and are alkyl radicals with 1–4 carbon atoms.

Ethers of this type are described in published European patent application EP-A-361 493.

Examples representative of diethers of formula (I) are 2-methyl-2-isopropyl-1,3-dimethoxypropane, 2,2-diisobutyl-1,3-dimethoxypropane and 2-isopropyl-2-cyclopentyl-1,3-dimethoxypropane.

The above mentioned catalyst components can be prepared according to various methods. One of them consists of milling or comilling magnesium dihalide (used anhydrous, containing less than 1% water), with the titanium compound and the electron-donor compound under conditions where the magnesium dihalide is activated; the milled product is then treated one or more times with $TiCl_4$ in excess at a temperature ranging from 80° C. and 135° C., and then repeatedly washed with a hydrocarbon (hexane, for example) until all chlorine ions have disappeared.

According to another method the anhydrous magnesium halide is preactivated according to known methods and then reacted with an excess of $TiCl_4$ containing in solution the electron-donor compound. In this case also the operation takes place at a temperature between 80° and 135° C. The treatment with $TiCl_4$ is optionally repeated and the solid is then washed with hexane or another hydrocarbon solvent in order to eliminate all traces of nonreacted $TiCl_4$. Accordingly to another method, a $MgCl_2.nROH$ adduct where n generally ranges from 1 to 3, and ROH is ethanol, butanol, or isobutanol, is made to react with an excess of $TiCl_4$ containing in solution the electron donor compound. The reaction temperature usually ranges from 80° to 120° C. The solid is then isolated and reacted once more with $TiCl_4$, then washed with a hydrocarbon until all traces of nonreacted $TiCl_4$ are eliminated. According to yet another method, magnesium alcoholates and chloroalcoholates (the chloroalcoholates can be prepared particularly as described in U.S. Pat. No. 4,220,554) are made to react with $TiCl_4$ in excess containing in solution the electron-donor compound, operating in this case also under the reaction conditions already described.

In the solid catalyst component, the titanium compound represented by Ti is generally present in a percentage by weight ranging from 0.5 to 10%, and the quantity of electron-donor compound which remains fixed on the solid (internal donor) is generally from 5 to 20% in moles with respect to the magnesium dihalide.

The titanium compounds which can be used for the preparation of the catalyst components are titanium halide or halogen alcoholates. Titanium tetrachloride is the preferred compound. Satisfactory results can be obtained also with titanium trihalides, particularly $TiCl_3.HR$, $TiCl_3.ARA$, and with titanium halogen alcoholates such as $TiCl_3OC_6H_5$.

The reactions indicated above bring to the formation of activated magnesium dihalide. In the art, other reactions are known, besides the ones just mentioned, which bring to the formation of activated magnesium dihalide starting from magnesium compounds different from the Mg halides, such as the magnesium carboxylates.

The cocatalysts used are Al trialkyl compounds, such as triethylaluminum, triisobutylaluminum, and tri-n-butylaluminum, or linear or cyclic Al alkyl compounds containing two or more aluminum atoms bonded to each other by way of O or N atoms, or $SO_2$, $SO_3$ or $SO_4$ groups. Examples of said compounds are:

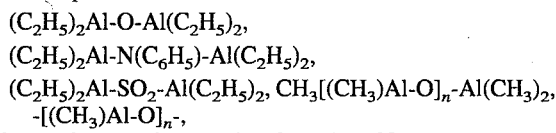

where n is a number ranging from 1 to 20.

One can also use $AlR_2H$ and $AlR_2OR'$ compounds, where R is an alkyl radical having 1–6 carbon atoms and R' represents an aryl radical substituted in one or more positions.

The aluminum alkyl compound is generally present in quantities that allow the Al/Ti ratio to vary from 1 to 1000.

The electron-donor compounds that can be used as external donors (added to the aluminum alkyl compound) comprise the aromatic acid esters (such as alkyl benzoate), heterocyclic compounds (such as 2,2,6,6-tetramethyl piperidine and 2,6 -diisopropylpiperidine), and in particular silicon compounds containing at least one Si-OR bond (where R represents a hydrocarbon radical). Some examples of silicon compounds are: $(tert-C_4H_9)_2Si(OCH_3)_2$, $(C_6H_{11})_2Si(OCH_3)_2$ and $(C_6H_5)_2 Si(OCH_3)_2$. The 1,3-diethers of formula (I) can also be used as external donors. In the case where the internal donor is one of the 1,3-diethers of formula (I), the external donor can be omitted.

It is also preferable if the polymer particles that are subjected to the process of the present invention have a bulk density ranging from 0.3 to 0.6 g/cm³, determined by way of ASTM 1895-69, method A.

An example of preferred particles that are particularly suitable for the addition of stabilizers and additives according to the present invention, are spherical or spheroidal particles having, besides the above mentioned bulk density values, a diameter ranging from 0.5 to 4.5 mm. The preferred particles seem to be those where at least 90% of the particles have a diameter ranging from 1 to 3.5 mm.

Said particles can be obtained by using catalyst components supported on the geometrically regular $MgCl_2$ particles described above.

The process of the present invention can be used for polymers obtained by either continuous or batch industrial processes.

Generally the polymerization is carried out at a temperature ranging from 40° C. to 160° C., and at atmospheric pressure or higher.

The following examples, which are given in order to illustrate, and not limit, the present invention, have been carried out in batch type laboratory autoclaves.

The following tests were conducted in order to evaluate certain characteristics of the products obtained in the examples:

pepper and salt test: 10 grams of stabilized spherical polymer are placed in an aluminum pan with a 9 cm diameter and introduced into a forced-air oven at a temperature of 150° C. The test is considered completed as soon as one of the spheres turns yellow;

oven-aging test: some specimens produced by injection molding, and with dimensions equal to 6×1×0.1 cm; are introduced in an oven at 150° C. The test is considered completed as soon as one of the specimens starts turning yellow.

General process for the preparation of a catalyst component

The solid catalyst component used in the examples is prepared as follows.

In inert atmosphere one introduces in a reactor equipped with agitator 28.4 g of $MgCl_2$, 49.5 g of anhydrous ethanol, 100 ml of ROL OB/30 vaseline oil, 100 ml of silicon oil having a viscosity of 350 cs, and the content is heated to 120° C. until the $MgCl_2$ is dissolved. The hot mixture is then transferred to a 1500 ml vessel, equipped with an Ultra Turrax T-45 N agitator, and containing 150 ml of vaseline oil and 150 ml of silicon oil. The temperature is maintained at 120° C. while the content is stirred for 3 minutes at 3000 rpm. The mixture is then discharged into a 2 liter vessel equipped with agitator and containing 1000 ml of anhydrous n-heptane cooled to 0° C. The particles obtained are recovered by filtration, washed with 500 ml of n-hexane, and heated by gradually bringing the temperature to 180° C. in nitrogen flow, thus obtaining a decrease in alcohol content from 3 moles to 2.1 moles per mole of $MgCl_2$.

25 g of the adduct thus obtained are transferred in a reactor equipped with agitator and containing 625 ml of $TiCl_4$, at 0° C., under agitation, heating it to 100° C. in the space of one hour. When the temperature reaches 40° C. one adds enough diisobutyl phthalate to bring the magnesium/phthalate molar ratio to 8.

The reactor content is heated to 100° C. for two hours while stirring, and then the solid is allowed to settle and the hot liquid is syphoned out. One adds 550 ml of $TiCl_4$ and the mixture is heated to 120° C. for one hour while stirring. Said stirring is interrupted, and the solid allowed to settle. The liquid is syphoned out hot, then the solid is washed 6 times with 200 ml of n-hexane at 60° C. each time, and then three times at ambient temperature.

EXAMPLE 1

Into a 4 liter stainless steel reactor equipped with heating jacket and magnetic agitator, introduced, at ambient temperature, is a suspension of 7 mmoles of $AlEt_3$ and 0.35 mmoles of phenyltriethoxysilane in 70 mL of n-heptane and 15 mg of Ti supported solid catalyst.

About 2 N/l of hydrogen, enough to obtain a polymer MFR of about 5 g/10 min, are introduced in the autoclave, and finally 1200 g of propylene are added while the temperature is increased. The mixture is maintained under agitation for 2 hours at 70° C.

At the end of the two hours the liquid propylene is extracted by way of a syphon with a super fine terminal net, and directed to the bottom of an Erlenmeyer flask containing n-heptane, where it is released in gas form bubbling in the aliphatic hydrocarbon.

Following the complete evaporation of the n-heptane in a ROTAVAPOR, there is the presence of a sticky substance on the walls of the flask that weighs 7 g and has the following characteristics:

oligomers: 47% fraction soluble in xylene at 25° C. (except for the oligomers): 23.2% fraction insoluble in xylene at 25° C.: 3.1% fraction insoluble in xylene at 125° C.: 25.3% analysis of catalytic residues: 300 ppm of Ti; 230 ppm of Mg; 23.5% of Al.

442 g of spherical polypropylene are recovered from the reactor.

This example shows that during polymerization in liquid monomer there is a considerable amount of polymer fractions that do not dissolve in the liquid monomer.

EXAMPLE 2

A standard polymerization test in liquid propylene is carried out in the same apparatus and according to the same operating method described in example 1.

After 2 hours of reaction introduced into the autoclave under pressure are 10 g of distilled water, and after 1 minute, using a small cylinder, 1.2 g of a mixture of stabilizers suspended in about 50 g of liquid propylene. The mixture of stabilizers comprises:

0.5 g of IRGANOX 1010

0.4 g of SANDOSTAB PEPQ 0.3 g of Ca stearate.

The mixture is agitated for 1 minute, and then the autoclave is flashed in flare while the agitator is maintained in motion. 500 g of stabilized spherical polypropylene are recovered.

10 g of the stabilized spherical polypropylene prepared above are subjected to the pepper and salt test in a 150° C. oven. The test shows a specimen resistance of 7 hours.

The remaining polymer is pelletized in a microextruder. These pellets are then used to make 1 mm thick specimens by way of injection molding using a CARVER press. From these specimens two 6×1×0.1 cm samples are prepared and subjected to the aging test in a 150° C. oven. The first of the two samples shows signs of yellowing after 24 days, while the second after 26 days. Averaging out the two values, one can establish the thermooxidation period is 25 days.

EXAMPLE 3

A standard polymerization test is carried out according to the methods described in example 1. After two hours, the reaction is terminated by introducing into the reaction vessel 5 g of tertiary ethoxy amines (ATMER 163) using an aerosol bomb. After stirring for 5 minutes there is added according to the method described in example 2, 1.45 g of a stabilizer mixture consisting of:

0.2 g of GOOD-RITE 3114, 0.5 g of CHIMASSORB 944, 0.25 g of sodium stearate.

After agitating for 1 min, the autoclave is vented and the propylene is eliminated in flare, recovering 490 g of stabilized spherical polypropylene.

The samples subjected to a thermooxidation test in an oven at 150° C. showed a resistance of 10 days.

Parts of the pellets obtained by extruding the spherical polypropylene in a microextruder were used to prepare a film 50 μm thick and 5 cm wide. Some strips 3 cm wide and 50 μm thick were obtained from this film and subjected to accelerated UV radiation tests in a W.O.M. (Weather-O-Meter) 65, operating according to ASTM regulation 2565, method D. The film samples with different W.O.M. 65 exposure times were evaluated with a dynamometer. The tests were considered completed when the tensile strength (or elongation at break) value equaled 50% of the value of the nonexposed sample. The resistance of the sample being examined was of about 400 hrs of exposure. A polypropylene sample that has not been stabilized against UV radiations lasts about 50 hrs.

EXAMPLE 4

A standard polymerization test is carried out according to the method described in 1. After two hours, the reaction is terminated by introducing in the autoclave, under pressure, 3 g of triethanolamine, and the contents are stirred for 5 minutes.

According to the method described in example 2, there are added 3 of a stabilizer and additive mixture consisting of:

0.5 g of IRGANOX 1010;

0.25 g of SANDOSTAB PEPQ;

1 g of dibenzylidene sorbitol;

0.25 g of sodium stearate.

The contents are stirred for one additional minute before flashing the propylene in flare.

490 g of stabilized spherical polypropylene are recovered and subjected to a pepper-salt test in a 150° C. oven. The polypropylene has a resistance of 8 hrs.

The remaining portion of the stabilized spherical polypropylene is pelletized in a microextruder. The pellets are used to make a specimen by injection molding, using a CARVER press, said specimen having a HAZE value of 27%, while a similar polypropylene sample without additives has a value of 64%.

After the 1 mm specimens are subjected to an oven-aging test at 150° C., they show a resistance to thermooxidation of 25 days.

EXAMPLE 5

According to the method described in the Example 1 a standard propylene polymerization test is carried out. After two hours, the reaction is terminated by introducing 4 g of glycerol in the reactor. The contents are stirred for three additional minutes, and then, using the same procedure described in the preceding examples there are added 2.25 g of a mixture of stabilizers and additives consisting of:

0.5 g of IRGANOX 1010;

0.5 g of IRGAFOS 168;

1 g of erucamide;

0.25 g of calcium stearate.

The propylene is flashed after 2 minutes. 505 g of spherical stabilized polymer are obtained which are then pelletized in a microextruder. The pellets are then used to make a 1 mm thick specimen by way of injection molding using a CARVER press. The samples subjected to a thermooxidation test in a 150° C. oven show a resistance of 18 days.

The remaining portion of the pellets is used to prepare a film 50 micron thick and 5 cm wide. After 5 days from the preparation, one measures the friction coefficient (calculated according to ASTM regulation D 1894-63, method B), and the value obtained is 0.2, while the value for this coefficient for an erucamide free polypropylene is higher than 2.5.

Other features, advantages and embodiments of the invention disclosed herein will be readily apparent to those exercising ordinary skill after reading the foregoing disclosures. In this regards, while specific embodiments of the invention have been described in considerable detail, variations and modifications of these embodiments can be effected without departing from the spirit and scope of the invention as described and claimed.

I claim:

1. A process for adding at least one stabilizer, and optionally additives, to polyolefins in particle form obtained in liquid monomer by means of a Ziegler-Natta catalyst containing an aluminum alkyl component, wherein the addition of said stabilizer and optionally additives is carried out in liquid monomer in a step following polymerization, but preceding the flashing of the liquid monomer and after deactivation of the aluminum alkyl, wherein the stabilizer is at least one member selected from the group consisting of hindered phenols, phosphites, phosphonites, sulfides, disulfides, thioethers, and monomeric and polymeric hindered amine light stabilizers.

2. The process of claim 1, wherein the polyolefins are obtained by way of polymerization in liquid monomer of ethylene and $C_3$–$C_{10}$ α-olefins.

3. The process of claim 1, wherein the polyolefins are selected from isotactic polypropylene and crystalline copolymers of propylene containing from 2 to 30% in moles of ethylene and/or $C_4$–$C_{10}$ α-olefins.

4. The process of claim 1, wherein the quantity of stabilizer, and optionally additives, added is from 0.005 to 50% by weight with respect to the polymer.

5. The process of claim 1, wherein the quantity of stabilizer, and optionally additives, added is from 0.01 to 30% by weight with respect to the polymer.

6. The process of claim 1, wherein the polyolefins are in the form of spherical or spheroidal particles having an bulk density from 0.3 to 0.6 $g/cm^3$, and a diameter from 0.5 to 4.5 mm.

7. The process of claim 1, wherein the aluminum alkyl is deactivated by reaction with hydroxyl compounds.

* * * * *

UNITED STATES PATENT AND TRADEMARK OFFICE
CERTIFICATE OF CORRECTION

PATENT NO. : 5,455,289

DATED : October 3, 1995

INVENTOR(S) : Giancarlo Caselli

It is certified that error appears in the above-identified patent and that said Letters Patent is hereby corrected as shown below:

At col. 4, line 27, change "compound" to --component--.

At col. 9, line 14, change "3" to --3 g--.

Signed and Sealed this

Twenty-first Day of May, 1996

*Attest:*

BRUCE LEHMAN

*Attesting Officer*  Commissioner of Patents and Trademarks